US009035890B2

(12) United States Patent
Hwang et al.

(10) Patent No.: US 9,035,890 B2
(45) Date of Patent: May 19, 2015

(54) MOBILE DEVICE AND CONTROL METHOD FOR A MOBILE DEVICE

(75) Inventors: Myunghee Hwang, Seoul (KR); Jihee Hong, Bucheon (KR); Kyoungryul Park, Seoul (KR); Ilkon Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 541 days.

(21) Appl. No.: 13/349,506

(22) Filed: Jan. 12, 2012

(65) Prior Publication Data

US 2012/0306781 A1 Dec. 6, 2012

(30) Foreign Application Priority Data

May 31, 2011 (KR) .................. 10-2011-0052425

(51) Int. Cl.
*G06F 3/041* (2006.01)
*G06F 3/0488* (2013.01)
*G06F 3/0482* (2013.01)

(52) U.S. Cl.
CPC .......... *G06F 3/04883* (2013.01); *G06F 3/0482* (2013.01)

(58) Field of Classification Search
CPC ........................ G06F 3/0482; G06F 3/04883
USPC .................. 715/863, 769; 345/156–184; 361/679.21
See application file for complete search history.

(56) References Cited

U.S. PATENT DOCUMENTS

| | | | | |
|---|---|---|---|---|
| 5,757,368 A | * | 5/1998 | Gerpheide et al. ............ | 715/769 |
| 7,250,734 B1 | * | 7/2007 | Iannello et al. ............ | 318/254.1 |
| 7,511,703 B2 | * | 3/2009 | Wilson et al. ................ | 345/175 |
| 7,626,569 B2 | * | 12/2009 | Lanier ........................... | 345/156 |
| 8,144,453 B2 | * | 3/2012 | Brown et al. ............ | 361/679.21 |
| 2005/0151059 A1 | * | 7/2005 | Nakajima et al. .......... | 250/208.1 |
| 2006/0119582 A1 | | 6/2006 | Ng et al. | |
| 2009/0327977 A1 | * | 12/2009 | Bachfischer et al. ......... | 715/863 |
| 2010/0026642 A1 | * | 2/2010 | Kim et al. ..................... | 345/173 |
| 2010/0085318 A1 | * | 4/2010 | Lee et al. ...................... | 345/173 |
| 2010/0103640 A1 | * | 4/2010 | Brown et al. ................. | 361/829 |
| 2010/0153996 A1 | * | 6/2010 | Migos et al. .................... | 725/39 |
| 2010/0224424 A1 | * | 9/2010 | Kasajima ................... | 178/18.06 |
| 2011/0293062 A1 | * | 12/2011 | Lablans ......................... | 377/28 |
| 2012/0030624 A1 | * | 2/2012 | Migos .......................... | 715/830 |
| 2012/0105081 A1 | * | 5/2012 | Shaikh et al. ................. | 324/686 |

(Continued)

FOREIGN PATENT DOCUMENTS

CN 101405177 4/2009
CN 101558375 10/2009

(Continued)

OTHER PUBLICATIONS

The State Intellectual Property Office of the People's Republic of China Application Serial No. 201210050065.8, Office Action dated Apr. 2, 2014, 8 pages.

*Primary Examiner* — Prabodh M Dharia
(74) *Attorney, Agent, or Firm* — Lee, Hong, Degerman, Kang & Waimey

(57) ABSTRACT

The present invention relates to a mobile device capable of performing a touch input and a control method thereof. A mobile device according to an embodiment of the present invention may include a display unit configured to display a plurality of objects, a detector configured to detect a pattern surrounding at least one of the objects, and a controller configured to implement a function corresponding to the object surrounded by the pattern.

20 Claims, 11 Drawing Sheets

(56) References Cited

U.S. PATENT DOCUMENTS

2012/0169651 A1* 7/2012 Chang ............................ 345/174
2012/0290950 A1* 11/2012 Rapaport et al. .............. 715/753
2013/0016093 A1* 1/2013 Ueno et al. .................... 345/419

FOREIGN PATENT DOCUMENTS

| | | |
|---|---|---|
| EP | 0740245 | 10/1996 |
| EP | 2124141 | 11/2009 |

* cited by examiner

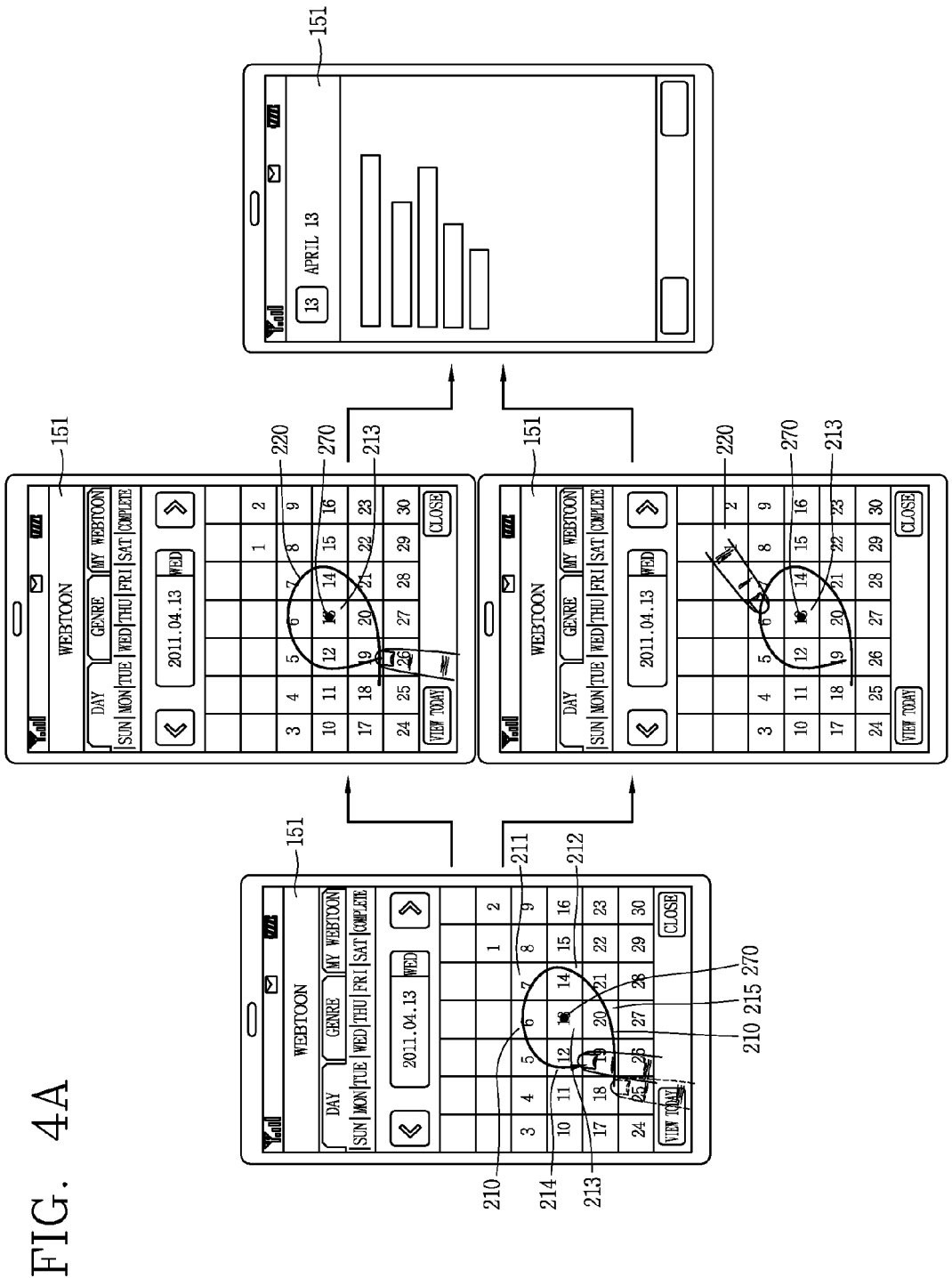

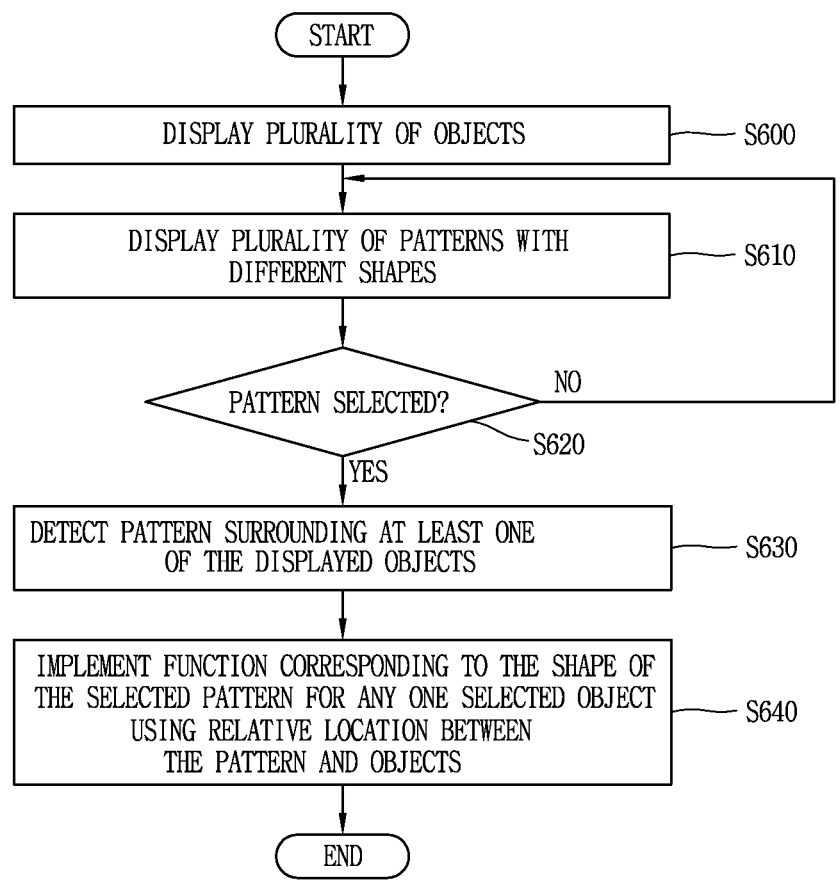

MOBILE DEVICE AND CONTROL METHOD FOR A MOBILE DEVICE

CROSS REFERENCE TO RELATED APPLICATION

Pursuant to 35 U.S.C. §119(a), this application claims the benefit of earlier filing date and right of priority to Korean Application No. 10-2011-0052425, filed on May 31, 2011, the contents of which is incorporated by reference herein in its entirety.

BACKGROUND OF THE INVENTION

1. Field of the Invention

The present disclosure relates to a mobile device capable of performing a touch input and a control method for a mobile device.

2. Description of the Related Art

A mobile device is an electronic device that can be carried by the user, having at least one of a voice and video communication function, an information input/output function, a data storage function, and the like that becomes multifunctional, such a mobile devices are implemented as an integrated multimedia player having various complicated functions, for example, capturing still images or moving images, playing music or video files, playing games, receiving broadcast services, connecting the Internet, and the like.

A variety of new attempts have been applied to such a multimedia player in the aspect of hardware or software in order to implement various complicated functions. For the functional support and enhancement of such a mobile device, it may be considered to improve the structural and/or software aspects of the mobile device.

In recent years, a touch screen has been provided in the mobile device to display virtual keys on the screen, and thus a display unit has been used for an input device as well as an output device. However, the display unit may be limited in its size, and as a result, the user may feel inconvenience in touching virtual keys displayed in a small size.

SUMMARY OF THE INVENTION

An objective of the present invention is to provide a touch input scheme for allowing the user to more easily select an object displayed on the display unit.

In order to accomplish the foregoing objective, a mobile device according to an embodiment of the present invention may include a display unit configured to display a plurality of objects, a detector configured to detect a pattern surrounding at least one of the objects, and a controller configured to implement a function corresponding to the object surrounded by the pattern.

The mobile device may be characterized in that the controller implements a function corresponding to any one of the objects using a relative location between the objects and a pattern surrounding the objects.

The mobile device may be characterized in that any one of the objects is an object most adjacent to a reference point of the pattern.

The mobile device may be characterized in that an object most adjacent to the reference point is displayed in a distinguished manner from the other objects on the display unit, and a function corresponding to the object most adjacent to the reference point is implemented based on a touch input detected when the object most adjacent thereto is displayed in a distinguished manner.

The mobile device may be characterized in that when there are a plurality of objects adjacent to the reference point, the plurality of objects are displayed in a distinguished manner from the other objects, and any one of the plurality of objects may be selected by the user.

The mobile device may be characterized in that the controller implements a function corresponding to any one of the objects based on the overlapping areas of the object with an inner portion of the pattern.

The mobile device may be characterized in that any one of the objects is an object having the largest overlapping area with an inner portion of the pattern.

The mobile device may be characterized in that the pattern is a loop drawn in a drag manner on the display unit.

The mobile device may be characterized in that the trace of the loop drawn in a drag manner is displayed on the display unit.

The mobile device may be characterized in that the display unit displays a reference point of the loop, or displays an object most adjacent to the reference point of the loop in a distinguished manner from the other objects.

The mobile device may be characterized in that the controller implements a function corresponding to the surrounded object when a closed curve or figure is formed by the loop.

The mobile device may be characterized in that the controller implements a function corresponding to the surrounded object when a touch input for moving the pattern is released.

The mobile device may be characterized in that a plurality of patterns made of different shapes are displayed on the display unit, and the controller implements different functions based on the different shapes surrounding the same object.

The mobile device according to an embodiment of the present invention may be characterized in that the controller downloads data linked to the object when the object is surrounded by specific one of the plurality of patterns, and uploads the object to a social network service (SNS) site when the object is surrounded by the other another specific one of the plurality of patterns.

A method of controlling a mobile device according to an embodiment of the present invention may include displaying a plurality of objects, detecting a pattern surrounding at least one of the displayed objects, and implementing a function corresponding to the object surrounded by the pattern based on a touch input.

The method of controlling a mobile device according to an embodiment of the present invention may be characterized in that implementing the function implements a function corresponding to any one of the objects using a relative location between the objects and a pattern surrounding the objects.

The method of controlling a mobile device according to an embodiment of the present invention may further include displaying a pattern drawn in a drag manner on the display unit.

The method of controlling a mobile device may be characterized in that implementing the function implements a function corresponding to the object surrounded by the pattern when a closed curve or figure is formed by the pattern.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4A, 4B, 4C and 4D are conceptual views illustrating an operational example that is implemented by the control method of FIG. 2 through a pattern entered by the user;

FIG. 6 is a flow chart illustrating a control method applicable to a mobile device according to another embodiment of the present invention.

DETAILED DESCRIPTION OF THE INVENTION

Figure 1:
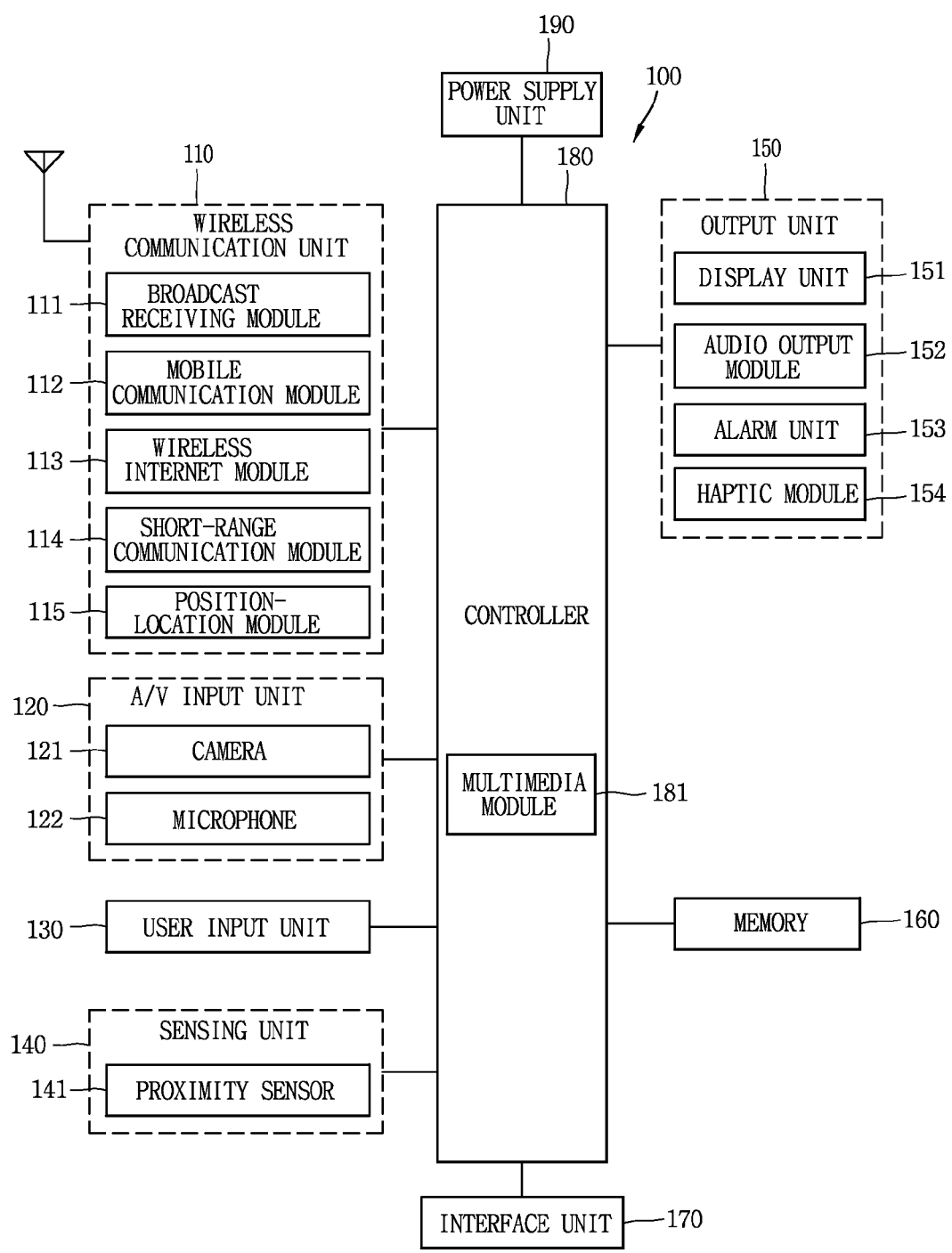
FIG. 1 is a block diagram illustrating a mobile device according to an embodiment of the present invention.

Hereinafter, the embodiments disclosed herein will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function.

In describing the embodiments disclosed herein, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the technological spirit disclosed herein by the accompanying drawings.

A mobile device disclosed herein may include a portable phone, a smart phone, a laptop computer, a digital broadcast mobile device, a personal digital assistant (PDA), a portable multimedia player (PMP), a navigation, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile device 100 according to an embodiment disclosed herein. The mobile device 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile device may be implemented with greater or less number of elements than those illustrated elements.

The wireless communication unit 110 typically includes one or more elements allowing radio communication between the mobile device 100 and a wireless communication system, or allowing radio communication between radio communication the mobile device 100 and a network in which the mobile device 100 is located. For example, the wireless communication unit 110 may include a broadcast receiving module 111, a mobile communication module 112, a wireless Internet module 113, a short-range communication module 114, a position location module 115, and the like.

The broadcast receiving module 111 receives broadcast signals and/or broadcast associated information from an external broadcast management server through a broadcast channel.

The broadcast channel may include a satellite channel and/or a terrestrial channel. The broadcast management server may mean a server that generates and transmits a broadcast signal and/or broadcast associated information or a server that receives a previously generated broadcast signal and/or broadcast associated information and transmits to the mobile device 100. The broadcast signal may include a TV broadcast signal, a radio broadcast signal and a data broadcast signal as well as a broadcast signal in a form that a data broadcast signal is coupled to the TV or radio broadcast signal.

The broadcast associated information may mean information regarding a broadcast channel, a broadcast program, a broadcast service provider, and the like. The broadcast associated information may also be provided through a mobile communication network, and in this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may receive a broadcast signal using various types of broadcast systems. In particular, the broadcast receiving module 111 may receive a digital broadcast signal using a digital broadcast system such as digital multimedia broadcasting-terrestrial (DMB-T), digital multimedia broadcasting-satellite (DMB-S), media forward link only (MediaFLO), digital video broadcast-handheld (DVB-H), integrated services digital broadcast-terrestrial (ISDB-T), and the like.

The broadcast receiving module 111 is, of course, configured to be suitable for every broadcast system that provides a broadcast signal as well as the above-mentioned digital broadcast systems. The broadcast signal and/or broadcast-associated information received through the broadcast receiving module 111 may be stored in the memory 160.

The mobile communication module 112 transmits and/or receives a radio signal to and/or from at least one of a base station, an external terminal and a server over a mobile communication network. The radio signal may include a voice call signal, a video call signal and/or various types of data according to text and/or multimedia message transmission and/or reception.

The mobile communication module 112 may be configured to implement an video communication mode and a voice communication mode. The video communication mode refers to a configuration in which communication is made while viewing an image of the counterpart, and the voice communication mode refers to a configuration in which communication is made without viewing an image of the counterpart. The mobile communication module 112 may be configured to transmit or receive at least one of voice or image data to implement the video communication mode and voice communication mode.

The wireless Internet module 113 is a module for supporting wireless Internet access. The wireless Internet module 113 may be built-in or externally installed to the mobile device 100. The wireless internet module 113 may use a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

The short-range communication module 114 is a module for supporting a short-range communication. The short-range communication module 114 may use a short-range communication technology including Bluetooth™, Radio Frequency IDentification (RFID), Infrared Data Association (IrDA), Ultra WideBand (UWB), ZigBee T™, and the like.

The position location module 115 is a module for checking or acquiring a location of the mobile device, and there is a GPS module as a representative example.

Referring to FIG. 1, the A/V (audio/video) input unit 120 receives an audio or video signal. The A/V (audio/video) input unit 120 may include a camera 121 and a microphone 122.

The camera 121 processes a image frame, such as still picture or video, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Two or more cameras 121 may be provided according to the use environment of the mobile device.

The microphone 122 receives an external audio signal through a microphone in a phone call mode, a recording mode, a voice recognition mode, and the like, and processes the audio signal into electrical voice data. The processed voice data may be converted and output into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured with a keypad, a dome switch, a touch pad (pressure/capacitance), a jog wheel, a jog switch, and the like.

The sensing unit 140 detects a current status of the mobile device 100 such as an opened or closed state of the mobile device 100, a location of the mobile device 100, an orientation of the mobile device 100. The sensing unit 140 generates a sensing signal for controlling the operation of the mobile device 100.

For example, when the mobile device 100 is a slide phone type, The sensing unit 140 may sense an opened or closed state of the slide phone. Furthermore, the sensing unit 140 takes charge of a sensing function associated with whether or not power is supplied from the power supply unit 190, or whether or not an external device is coupled to the interface unit 170.

The output unit 150 is configured to provide an output for audio signal, video signal, or alarm signal. The output unit 150 may include the display unit 151, an audio output module 152, an alarm unit 153, a haptic module 154, and the like.

The display unit 151 may display (output) information processed in the mobile device 100. For example, when the mobile device 100 is in a phone call mode, the display unit 151 may display a User Interface (UI) or a Graphic User Interface (GUI) associated with a call. When the mobile device 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display. Some of those displays may be configured with a transparent or optical transparent type to allow viewing of the exterior through the display unit, and may be called transparent displays.

An example of the typical transparent display may include a transparent LCD (TOLED), and the like. Under this configuration, a user can view an object positioned at a rear side of a mobile device body through a region occupied by the display unit 151 of the mobile device body.

Two or more display units 151 may be implemented according to a configured aspect of the mobile device 100. For instance, a plurality of the display units 151 may be arranged on one surface to be spaced apart from or integrated with each other, or may be arranged on different surfaces.

When the display unit 151 and a touch sensitive sensor (hereinafter, referred to as a "touch sensor") have an inter-layer structure (hereinafter, referred to as a "touch screen"), the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When there is a touch input to the touch sensor, the corresponding signals are transmitted to a touch controller (not shown). The touch controller processes the received signals, and then transmits corresponding data to the controller 180. Accordingly, the controller 180 may sense which region of the display unit 151 has been touched.

Referring to FIG. 1, a proximity sensor 141 may be arranged at an inner region of the mobile device 100 covered by the touch screen, or near the touch screen. The proximity sensor 141 sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of convenience of brief explanation, when the pointer is positioned to be proximate to the touch screen without contact will be referred to as 'proximity touch', whereas when the pointer substantially comes in contact with the touch screen will be referred to as 'contact touch'. A position corresponding to the proximity touch of the pointer on the touch screen, corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile device 100, e.g., sound alarming a call received or a message received, and so on. The audio output module 152 may include a receiver, a speaker, a buzzer, and so on.

The alarm unit 153 outputs signals notifying occurrence of events from the mobile device 100. The events may include call received, message received, key signal input, touch input, and so on.

The alarm unit 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm unit 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects through a user's direct contact, or a user's muscular sense using a finger or a hand. Two or more haptic modules 154 may be implemented in two or more provided according to the configuration of the mobile device 100.

The memory 160 may store a program for processing and controlling the controller 180. Alternatively, the memory 160 may temporarily store input/output data (e.g., phonebook data, messages, audios, still images, videos, and the like). Also, the memory 160 may store data related to various patterns of vibrations and sounds output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile device 100 may operate a web storage which performs the storage function of the memory 160 on the Internet.

The interface unit 170 may generally be implemented to interface the mobile device with external devices. The interface unit 170 may allow a data reception from an external device, a power delivery to each component in the mobile device 100, or a data transmission from the mobile device 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile device 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile device 100 via a port.

Also, the interface unit 170 may serve as a path for power to be supplied from an external cradle to the mobile device 100 when the mobile device 100 is connected to the external cradle or as a path for transferring various command signals input from the cradle by a user to the mobile device 100. Such various command signals or power inputted from the cradle may operate as signals for recognizing that the mobile device has accurately been mounted to the cradle.

The controller 180 typically controls the overall operations of the mobile device 100. For example, the controller 180 performs the control and processing associated with telephony calls, data communications, video calls, and the like. The controller 180 can perform a pattern recognition processing so as to recognize writing or drawing input on the touch screen as text or image.

Furthermore, the controller 180 may include a detector 181 for detecting a pattern surrounding at least one of objects displayed on the display unit 151. If the location, size, shape of a pattern is detected at the detector 181, then the controller 180 may implement a function corresponding to the object surrounded by the pattern using the information.

Furthermore, the controller 180 may include a multimedia module 181 which provides multimedia playback. The multimedia module 181 may be configured as part of the controller 180 or as a separate component.

The power supply unit 190 receives external power and internal power under the control of the controller 180. The power supply unit 190 provides power required by various components.

Various embodiments described herein may be implemented in a medium that can be read by a computer or similar device using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electrical units designed to perform the functions described herein. In some cases, such embodiments may be implemented in the controller 180 itself.

For software implementation, the embodiments such as procedures or functions may be implemented together with separate software modules. The software modules may perform at least one function or operation described herein.

Software codes can be implemented by a software application written in any suitable programming language. The software codes may be stored in the memory 160 and executed by the controller 180.

Hereinafter, a method of processing a user input to a mobile device 100 will be described.

The user input unit 130 may be manipulated to receive a command for controlling the operation of the mobile device 100, and may include a plurality of manipulation units. The manipulation units may be commonly designated as a manipulating portion, and any method may be employed if it is a tactile manner allowing the user to perform manipulation with a tactile feeling.

Various kinds of visual information may be displayed on the display unit 151. The visual information may be displayed in a form of characters, numerals, symbols, graphics, or icons.

For an input of the visual information, at least one of the characters, numerals, symbols, graphics, or icons may be displayed with a predetermined arrangement so as to be implemented in a form of keypad. Such a keypad may be referred to as a so-called "soft key or virtual key."

The display unit 151 may be operated in one entire region, or may be divided and operated into a plurality of regions. In case of the latter, the plurality of regions may be configured to operated in an associated manner with one another.

For example, an output window and an input window may be displayed at an upper portion or lower portion of the display unit 151, respectively. The output window and input window are regions assigned to output or input information, respectively.

A soft key for which numerals for entering a phone number or the like are displayed may be displayed on the input window. If the soft key is touched, then numerals or the like corresponding to the touched soft key may be displayed on the output window. If a manipulating unit is manipulated, then a phone call connection to the phone number displayed on the output window may be attempted or a text displayed on the output window may be entered to the application.

The display unit 151 or touch pad may be configured to receive a touch input by scroll. The user may scroll the display unit 151 or touch pad to move an object displayed on the display unit 151, for example, a cursor or pointer located on the icon. Moreover, when a finger is moved on the display unit 151 or touch pad, a path along which the finger is moved may be visually displayed on the display unit 151. It may be useful for the user to edit an image displayed on the display unit 151.

Furthermore, a function of the mobile device may be carried out when the display unit 151 (touch screen) and touch pad are touched together within a predetermined range of time. For example the user may clamp a mobile device body using a thumb and index finger. The function may be activation or deactivation of the display unit 151 or touch pad.

Embodiments associated with a control method that can be implemented in a mobile device having the foregoing configuration will be described with reference to the accompanying drawings. The embodiments which will be described may be used individually or in association with one another. Furthermore, the embodiments which will be described may be used in association with the foregoing user interface (UI).

Figure 2:
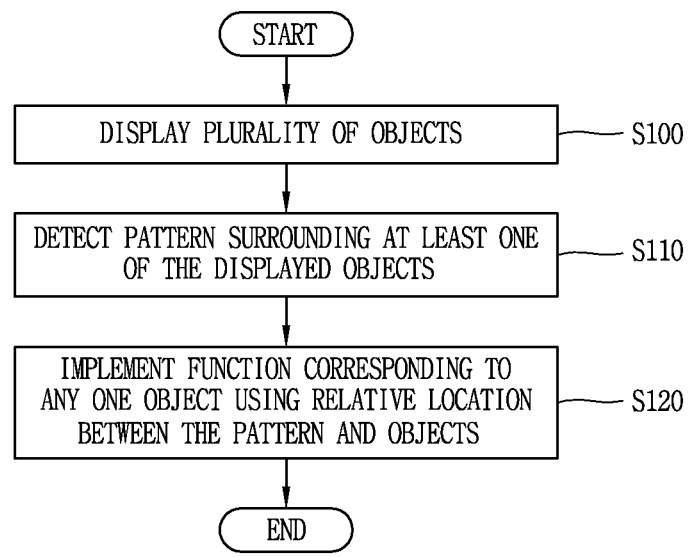
FIG. 2 is a flow chart illustrating a control method applicable to a mobile device according to an embodiment of the present invention.
Figure 3:
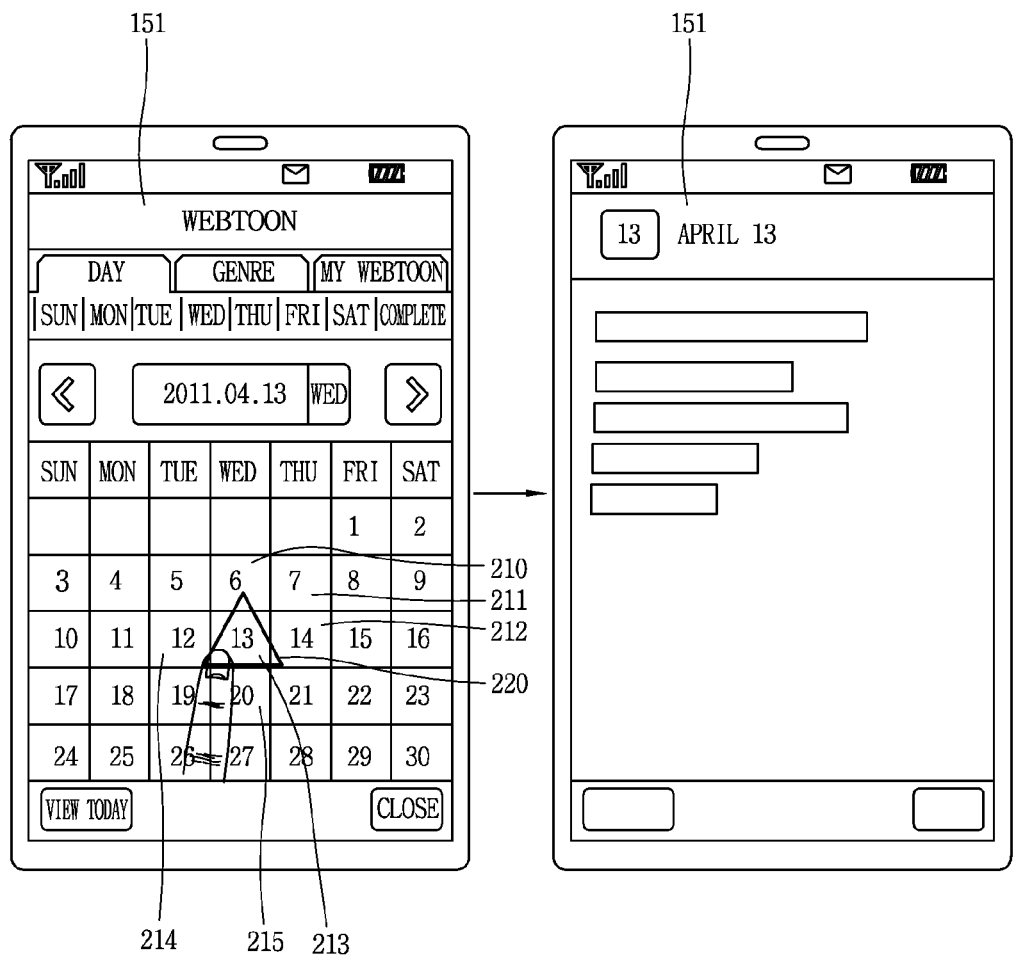
FIG. 3 is a conceptual view illustrating an operational example of a mobile device that is implemented by the control method of FIG. 2.

A method of implementing functions corresponding to the objects displayed on the display unit 151 by the controller 180 of the mobile device 100 and a pattern detected by the detector 181 according to the present invention will be described in detail. FIG. 2 is a flow chart illustrating a method of controlling a mobile device 100 associated with an embodiment of the present invention, and FIG. 3 is a conceptual view illustrating a mobile device to which the control method disclosed in FIG. 2 is applied.

The method of controlling a mobile device disclosed in FIG. 3 will be described with reference to FIGS. 2 and 3 together. A mobile device 100 (refer to FIG. 3) according to an embodiment of the present invention may include a display unit 151 disposed at the front surface thereof, and the display unit 151 may be configured to allow the user to perform a touch input.

According to the control method, a plurality of objects may first be displayed on the display unit 151 (S100). The objects 210-215 (refer to FIG. 3) may be subject to a touch input and represent graphic objects displayed on the screen of the display unit 151. The graphic objects may represent all kinds of visually displayable objects on the screen such as text, icons, images, videos, user interfaces (UIs) (e.g., buttons, menus, etc.), and the like.

Furthermore, the objects may be an icon of the stereoscopic image or part of the icon. For example, each facet of a polyhedron implemented in a stereoscopic image may be made of icons selected by a touch.

If the objects 210-215 are displayed on the display unit 151 and a control command for implementing a function corresponding to any one of the objects 210-215 is entered on the display unit, the detector 181 (refer to FIG. 1) detects a pattern 220 (refer to FIG. 3) surrounding at least one of the objects (S110). The pattern 220 may be a loop surrounding an object desired to be selected by the user among the displayed objects, which is a type of closed curve or figure. Furthermore, the pattern 220 may be an open loop. The pattern 220 may surround any one or two or more of the objects displayed on the display unit 151.

The pattern 220 may be a shape drawn by the user on the display unit 151, or a predetermined shape, for example, a triangle, a rectangle, a circle, or the like. The pattern 220 may be displayed on the display unit 151 to allow the user to correctly recognize which object is surrounded by the pattern among the objects displayed on the display unit 151.

Furthermore, the pattern 220 may be displayed on the display unit 151 in a predetermined shape, based on the users touch input, or may be continuously displayed on the display unit 151 along with displaying the objects. If a pattern 220 surrounding the object is detected by the detector 181 (refer to FIG. 1), the controller 180 (refer to FIG. 1) implements a function corresponding to any one of the surrounded objects using a relative location between the surrounded objects and the pattern 220 based on the users touch input (S120).

The controller 180 using a relative location between the pattern 220 and objects surrounded by the pattern may denote using a distance between objects and a closed curve constituting the pattern 220 or a reference point of the figure, or using a relative overlapping area of the objects with an inner portion of the pattern. The reference point may be a central position of the closed curve or figure, or a position specified by the user.

If a touch input is detected in any region inside the pattern or any region outside the pattern, the controller 180 implements a function corresponding to an object most adjacent to the reference point, or implements a function corresponding to an object having the largest overlapping area with an inner portion of the pattern 220. Accordingly, as illustrated in FIG. 3, if a touch input is detected in any region inside the pattern or any region outside the pattern, the controller 180 implements a function corresponding to an object 213 having the largest area occupying the inner portion of the pattern 220 among the objects 210-215. Furthermore, when the reference point is set to the center of the pattern 220, the controller 180 implements a function corresponding to the object 213 most adjacent to the center of the pattern 220 based on a touch input detected in any region of the pattern.

In this manner, the controller 180 may implement a function corresponding to an object desired to selected by the user based on a touch input detected inside or outside the pattern 220 even when a touch input to a portion displayed with the object desired to selected by the user is not detected. As a result, according to the foregoing method, in a mobile device 100 according to an embodiment of the present invention, a touch input to an object may be detected by selecting the object using a pattern surrounding the object according to a touch even when a region displayed with the object is not correctly touched.

Figure 4B:
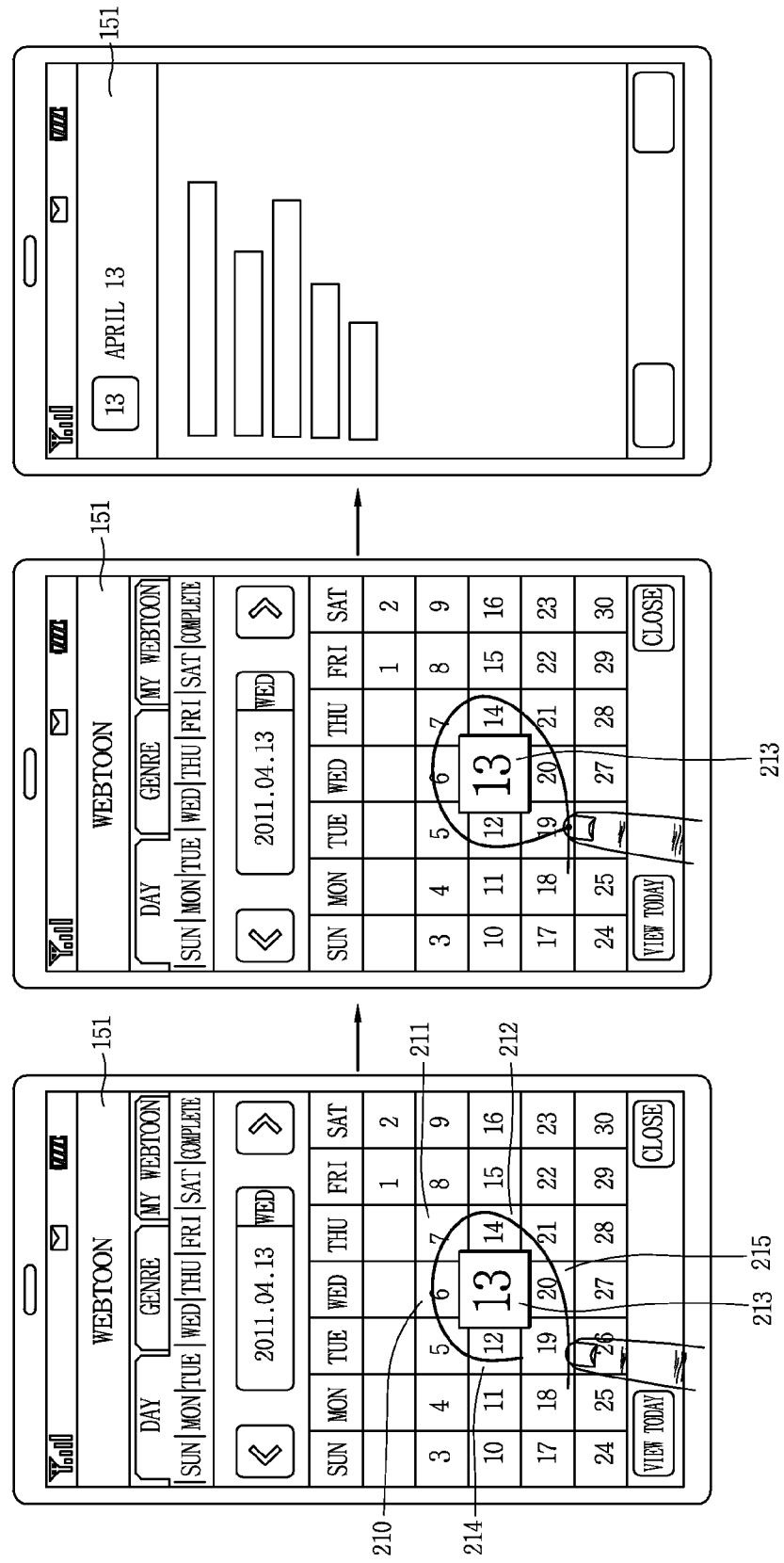

Hereinafter, various operational examples that can be implemented by the foregoing control method will be described. FIGS. 4A and 4B are conceptual views illustrating an operational example that is implemented by the control method of FIG. 2 through a pattern entered by the user.

As illustrated in FIG. 4A, when the user wants to select any one of the objects 210-215 displayed on the display unit 151, the user draws a pattern 220 in a touch input manner on the display unit 151 to surround an object 213 desired to be selected. The pattern 220, which has a loop shape, may be drawn in a drag or slide manner by the user on the display unit 151.

If the pattern 220 is drawn to surround the object 213, then the detector 181 (refer to FIG. 1) detects a pattern surrounding the object 213, and the controller 180 implements a function corresponding to the object 213 surrounded by the detected pattern based on a touch input. Here, the touch input may be a touch input at a position where the loop is formed as a closed curve or figure (an overlapping position with the trace), or a touch input where the loop is formed as a closed curve or figure and then detected at a position inside or outside the loop.

Furthermore, the controller 180 may display the trace of a loop drawn by the user on the display unit 151, or may display an expected reference point 270 of the loop being drawn on the display unit 151 based on a moving direction of the trace. In addition, as illustrated in FIG. 4B, an object 213 that can be selected by the loop may be highlighted or enlarged in a distinguished manner from the other objects based on a moving direction of the trace of the loop and a relative location between the loop and objects. Accordingly, the user may correctly recognize the object 213 to be selected by the pattern 220.

Figure 4C:
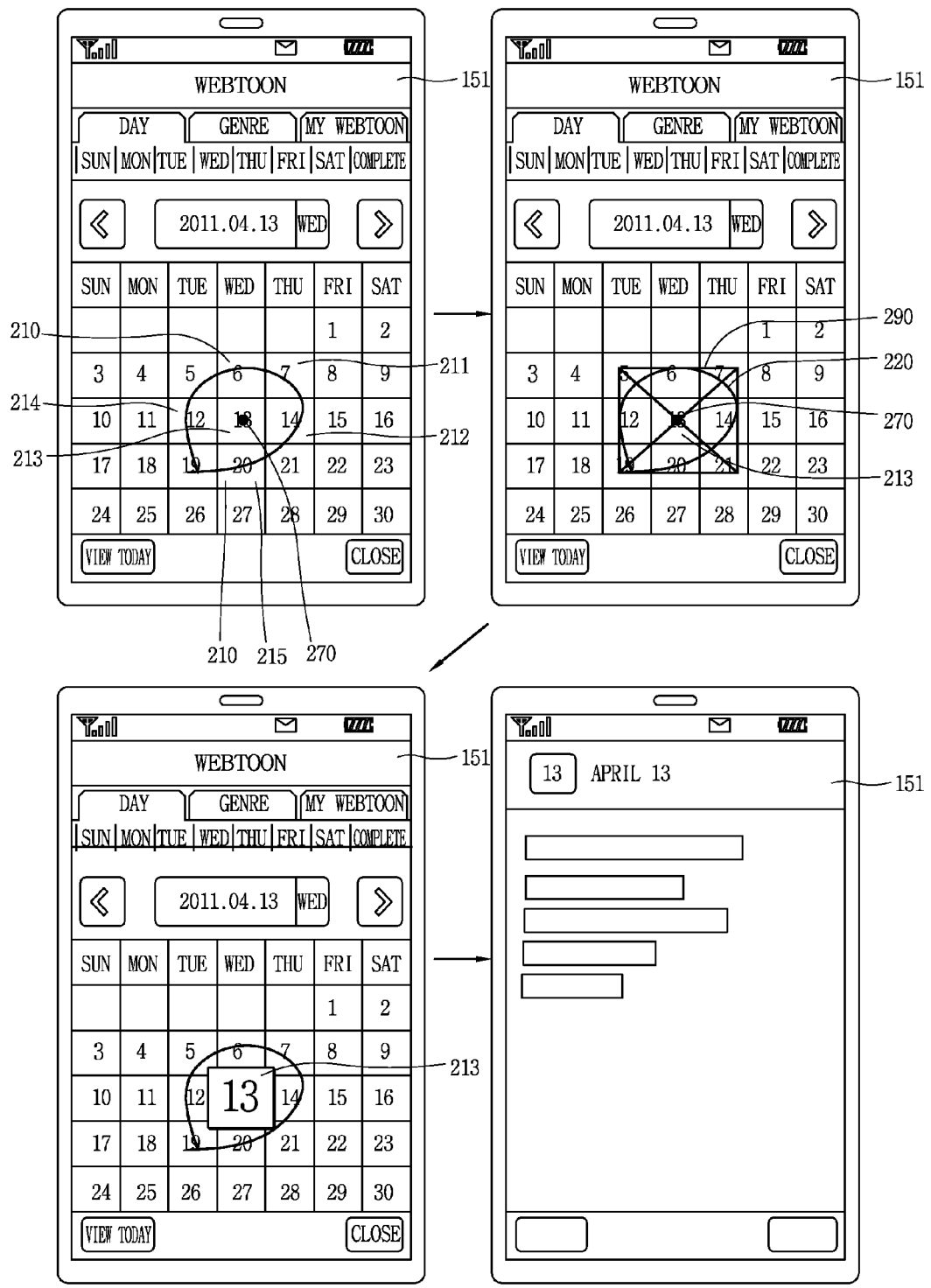
Figure 4D:
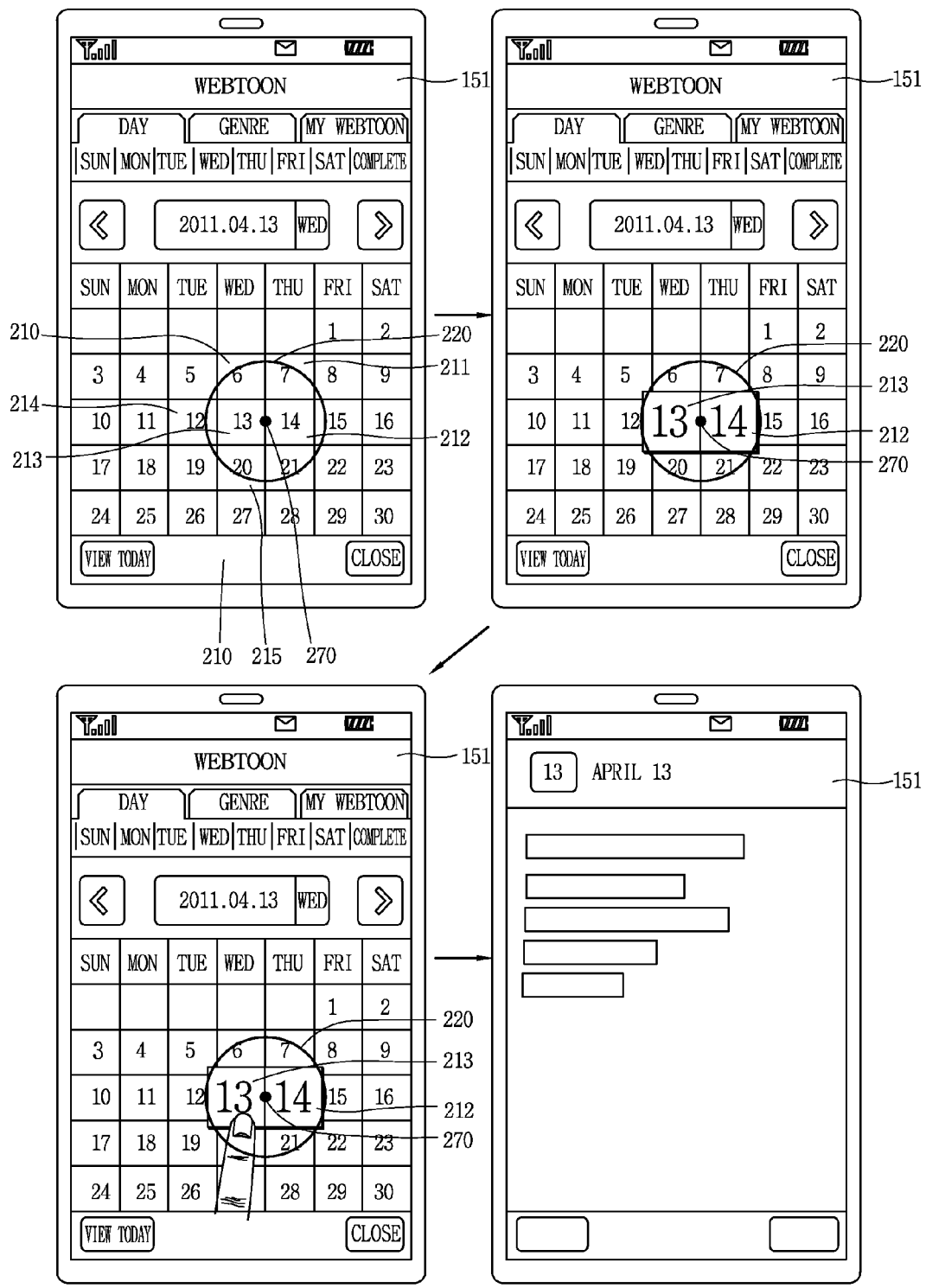

Referring to FIG. 4C, in a method of obtaining the reference point according to an embodiment of the present invention, the controller 180 (refer to FIG. 1) may set a position at which the diagonals of a rectangle 290 are crossed or a position at which the bisectors of each side of the rectangle 290 are crossed to a reference point using the rectangle 290 circumscribed to the pattern 220 drawn by the user. Furthermore, as illustrated in FIG. 4D, when there are a plurality of objects adjacent to the reference point, the controller 180 may enlarge or highlight the plurality of adjacent objects 212, 213 to display them in a distinguished manner from the other objects and the controller 180 may allow the user to select any one of the plurality of objects 212, 213 and implement a function corresponding to the selected object.

Figure 5A:
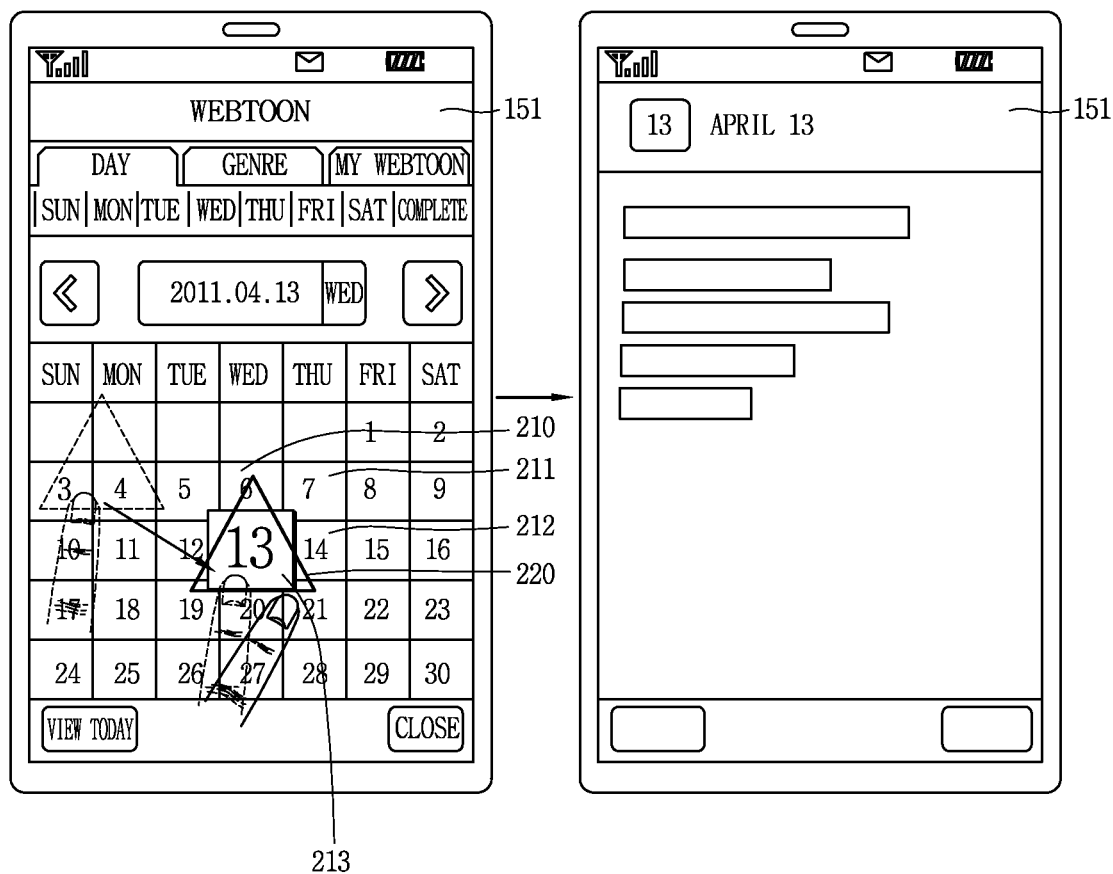
FIGS. 5A and 5B are conceptual views illustrating an operational example that is implemented by the control method of FIG. 2 through a specified pattern.
Figure 5B:
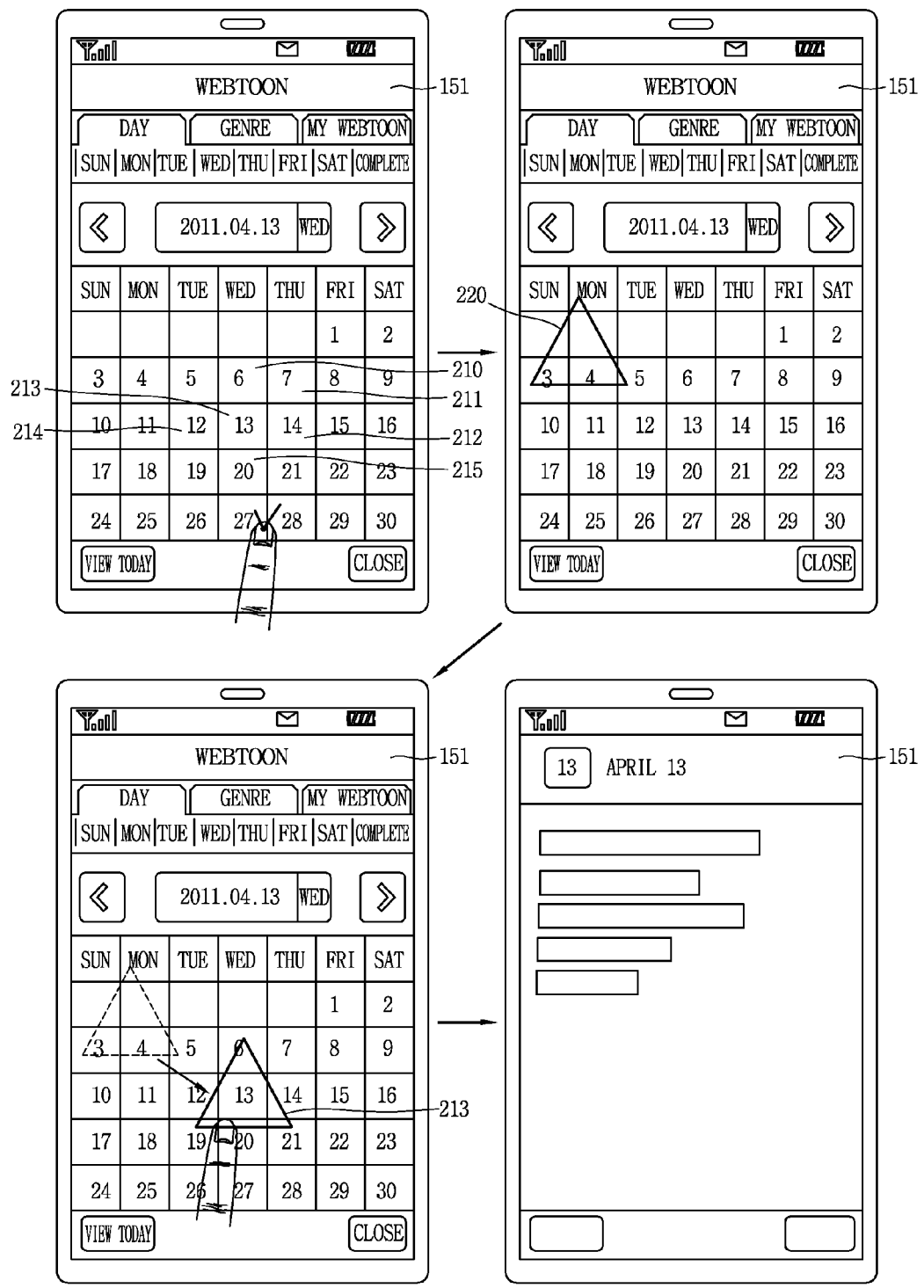

Next, the control method implemented by a specified pattern will be described. FIGS. 5A and 5B are conceptual views illustrating an operational example that is implemented by the control method of FIG. 2 through a specified pattern.

As illustrated in FIG. 5A, if objects 210-215 are displayed on the display unit 151 in a mobile device 100 according to an embodiment of the present invention, then a pattern 220 for implementing a function corresponding to any one of the objects may be continuously displayed on the display unit 151. The pattern 220 may be continuously displayed even when the objects displayed on the display unit 151 are changed.

Accordingly, when the user wants to implement a function by selecting an object surrounded by the pattern 220, the user moves the pattern 220 to surround an object 213 desired to be selected. The function corresponding to the object 213 surrounded by the pattern may be implemented by releasing a touch input for the movement of the pattern 220 or performing a touch input detected subsequent to the movement.

The controller 180 (refer to FIG. 1) may highlight or enlarge an object most adjacent to the reference point of the pattern, for example, the central position of the pattern based on the movement to display the object in a distinguished manner from the other objects. Although the controller 180 may display an object having the largest overlapping area with an inner portion of the pattern.

As illustrated in FIG. 5B, the pattern 220 may be displayed when a touch input is detected on the display unit 151. The method of implementing a function corresponding to the object surrounded by the pattern 220 may be the same as in the description of FIG. 5A.

Figure 7:
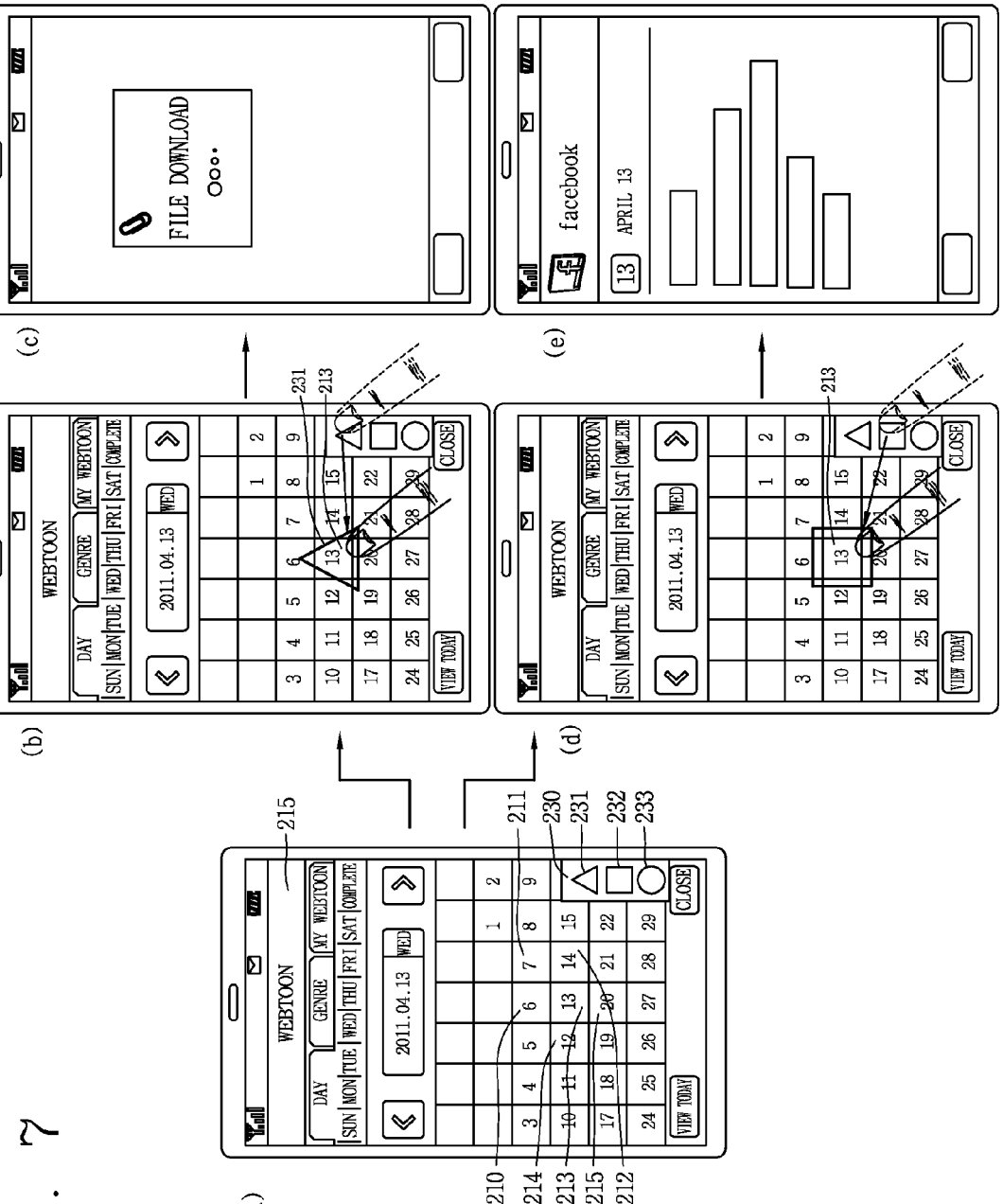
FIG. 7 is a conceptual view illustrating an operational example of a mobile device that is implemented by the control method of FIG. 6.

Hereinafter, the control method for selecting objects displayed on the display unit 151 using a pattern according to another embodiment of the present invention will be proposed. FIG. 6 is a flow chart illustrating a control method of the mobile device associated with the present invention, and FIG. 7 is a conceptual view of the mobile device to which the control method disclosed in FIG. 6 is applied. The method of controlling a mobile device disclosed in FIG. 7 will be described with reference to FIGS. 6 and 7 together.

According to the control method, first, a plurality of objects may be displayed on the display unit 151 (S600). The controller 180 (refer to FIG. 1) displays a plurality of patterns 230-233 (refer to FIG. 7A) while at the same time displaying objects on the display unit 151 or based on a touch input (S610). The patterns 230-233 are different shapes, and the controller 180 implements a different function according to the shape of a pattern even when the same object is surrounded by the pattern.

If any one of the displayed patterns 230-233 is selected by the user (S620), and a control command such as a touch input for selecting an object surrounded by the pattern is entered, the detector 181 (refer to FIG. 1) detects a pattern (refer to FIG. 3) surrounding at least one of the objects (S630). When the pattern is detected (S630), the controller 180 detects any one of the surrounded objects using a relative location between the surrounded objects and the pattern, and implements a function corresponding to the shape of the pattern 230-233 for the detected object (S640).

The displayed patterns 230-233 are configured to have different shapes, and the shape of the patterns 230-233 may be specified by the user. When the shape of the pattern 230-233 is specified by the user, the user may enter a pattern using the user input unit (refer to FIG. 1). Furthermore, a function corresponding to the shape of the pattern may be specified by the user.

Hereinafter, a method of implementing a different function based on the shape of the pattern by the control method will be described with reference to FIG. 7. For example, if a pattern having the shape of a triangle 231 is selected as illustrated in FIGS. 7(b) and 7(c), then the controller implements download linked to an object 213 surrounded by the pattern 231 when a control command for downloading data linked to the object is specified by the controller 180. Furthermore, if a pattern having the shape of a rectangle 232 is selected as illustrated in FIGS. 7(d) and 7(e), then the controller uploads an object 213 surrounded by the pattern 232 to a social network service (SNS) site when a control command for uploading the object surrounded by the pattern 232 to the social network service (SNS) site is specified by the controller 180.

In this manner, according to a mobile device 100 and a control method of a mobile device 100 associated with an embodiment of the present invention, it may be possible to perform a different function for the same object using a different pattern surrounding the same object. Furthermore, according to a mobile device 100 and a control method of a mobile device 100 associated with an embodiment of the present invention, a touch input to an object may be detected by selecting the object using a pattern surrounding the object subject to a touch even when a region displayed with the object is not correctly touched.

As described herein, according to a mobile device 100 and a control method a mobile device 100 associated with an embodiment of the present invention, a touch input to an object may be detected by selecting the object using a pattern surrounding the object subject to a touch even when a region displayed with the object is not correctly touched. According to a mobile device 100 and a control method a mobile device 100 associated with an embodiment of the present invention, it may be possible to provide a broad range of effectiveness for the object subject to a touch. In addition, according to a mobile device 100 and a control method a mobile device 100 associated with an embodiment of the present invention, it may be possible to perform a different function for the same object using a different pattern surrounding the same object.

The configurations and methods according to the above-described embodiments will not be applicable in a limited way to the foregoing mobile device. All or part of each embodiment may be selectively combined and configured to make various modifications thereto.

What is claimed is:

1. A mobile device, comprising:
a display unit configured to display a plurality of objects;
a detector configured to detect a pattern surrounding two or more objects of the displayed plurality of objects, the detected pattern a loop drawn in a drag manner on the display unit; and
a controller configured to:
determine one specific object of the at two or more surrounded objects based on overlapping areas between each of the two or more surrounded objects and an inner portion of the detected pattern; and
implement a function corresponding to the determined one specific object in response to a touch input,
wherein the determined one specific object is the object of the two or more surrounded objects having the largest overlapping area with the inner portion of the detected pattern.

2. The mobile device of claim 1, wherein the controller is further configured to:
control the display unit to display the determined one specific object such that it is distinguishable from the other of the two or more surrounded objects;
detect a touch input on the distinguishably displayed object; and
implement a function corresponding to the distinguishably displayed object based on the detected touch input.

3. The mobile device of claim 1, wherein the controller is further configured to:
determine a size of the overlapping areas between each of the two or more surrounded objects and the inner portion of the detected pattern; and
implement the function based on the determined size.

4. The mobile device of claim 1, wherein the controller is further configured to control the display unit to display a trace of the drawn loop.

5. The mobile device of claim 1, wherein the controller is further configured to implement the function corresponding to the determined one specific object when a closed curve or figure is formed by the drawn loop.

6. The mobile device of claim 1, wherein the controller is further configured to:
control the display unit to display the detected pattern;
detect a touch input applied on the displayed pattern; and
control the display unit to move the displayed pattern to surround at least one object of the displayed plurality of objects according to the detected touch input.

7. The mobile device of claim 6, wherein the controller is further configured to
detect release of the detected touch input; and
implement a function corresponding to a specific object of the at least one object surrounded by the displayed pattern when the touch input is released.

8. The mobile device of claim 1, wherein the controller is further configured to:
control the display unit to display a plurality of detected patterns each having a different shape; and
implement a different function corresponding to each of at least one of the displayed plurality of patterns that surround a same at least one object of the displayed plurality of objects.

9. The mobile device of claim 8, wherein the controller is further configured to:
download data linked to the same at least one object when the same at least one object is surrounded by a specific one of the displayed plurality of patterns; and
upload the same at least one object to a social network service (SNS) site when the same at least one object is surrounded by another specific one of the displayed plurality of patterns.

10. The mobile device of claim 1, wherein the controller is further configured to:
control the display unit to display at least two objects of the two or more surrounded objects such that they are distinguishable from the other of the two or more surrounded objects, the at least two objects having the same largest overlapping area;
detecting a user selection of one of the at least two distinguishable displayed objects; and
determining the selected one object as the specific object.

11. A method of controlling a mobile device, the method comprising:
displaying a plurality of objects on a display unit;
detecting a pattern surrounding two or more objects of the displayed plurality of objects, the detected pattern a loop drawn in a drag manner on the display unit;
determining one specific object of the two or more surrounded objects based on overlapping areas between each of the at two or more surrounded objects and an inner portion of the detected pattern; and
implementing a function corresponding to the determined one specific object in response to a touch input,
wherein the determined one specific object is the object of the two or more surrounded objects having the largest overlapping area with the inner portion of the detected pattern.

12. The method of claim 11, further comprising:
displaying the determined one specific object on the display unit such that it is distinguishable from the other of the two or more surrounded surrounded objects;
detecting a touch input applied on the distinguishably displayed object; and
implementing a function corresponding to the distinguishably displayed object based on the detected touch input.

13. The method of claim 11, further comprising:
displaying at least two objects of the two or more surrounded objects on the display unit such that they are distinguishable from the other of the two or more surrounded objects, the at least two objects having the same largest overlapping area;
detecting a user selection of one of the at least two distinguishably displayed objects; and
determining the selected one object as the one specific object.

14. The method of claim 11, further comprising:
determining a size of the overlapping areas between each of the two or more surrounded objects and the inner portion of the detected pattern; and
implementing the function based on the determined size.

15. The method of claim 11, further comprising displaying a trace of the drawn loop on the display unit.

16. The method of claim 11, further comprising:
displaying the detected pattern on the display unit;
detecting a touch input applied on the displayed pattern; and
moving the displayed pattern on the display unit to surround at least one object of the displayed plurality of objects according to the detected touch input.

17. The method of claim 16, further comprising:
detecting release of the detected touch input; and
implementing a function corresponding to a specific object of the at least one object surrounded by the displayed pattern when the detected touch input is released.

18. The method of claim 11, further comprising:
displaying a plurality of detected patterns on the display unit each having a different shape; and
implementing a different function corresponding to each of at least one of the displayed plurality of patterns that surround a same at least one object of the displayed plurality of objects.

19. The method of claim 18, further comprising:
downloading data linked to the same at least one object when the same at least one object is surrounded by a specific one of the displayed plurality of patterns; and
uploading the same at least one object to a social network service (SNS) site when the same at least one object is surrounded by another specific one of the displayed plurality of patterns.

20. The method of claim 11, further comprising implementing the function corresponding to the determined one specific object when a closed loop or figure is formed by the drawn loop.

* * * * *